US005588495A

United States Patent [19]

Dear et al.

[11] Patent Number: 5,588,495

[45] Date of Patent: Dec. 31, 1996

[54] ADAPTOR FOR HAND-HELD POWER TOOL

[75] Inventors: Aiden R. Dear, Stotfold Nr. Hitchin; John E. Higgs, Potters Bar, both of England

[73] Assignee: Avdel Systems Limited, Hertfordshire, England

[21] Appl. No.: 450,146

[22] Filed: May 26, 1995

[30] Foreign Application Priority Data

May 27, 1994 [GB] United Kingdom .................. 9410697

[51] Int. Cl.$^{6}$ .................................................. B23B 51/12

[52] U.S. Cl. .......................................... 173/170; 173/171

[58] Field of Search .................................. 173/168, 169, 173/170, 171

[56] References Cited

U.S. PATENT DOCUMENTS

| | | | |
|---|---|---|---|
| 3,844,360 | 10/1974 | Green et al. | 173/170 |
| 4,381,037 | 4/1983 | Cuneo | 173/170 |
| 4,830,253 | 5/1989 | Hunter | 227/8 |
| 5,295,620 | 3/1994 | Cousineau et al. | 227/156 |
| 5,332,156 | 7/1994 | Wheeler | 173/170 X |
| 5,361,851 | 11/1994 | Fox | 173/170 |
| 5,509,489 | 4/1996 | Lower, Jr. | 173/170 |

FOREIGN PATENT DOCUMENTS 649733 6/1985 Switzerland .

*Primary Examiner*—Scott A. Smith
*Assistant Examiner*—Jay A. Stelacone
*Attorney, Agent, or Firm*—Oblon, Spivak, McClelland, Maier & Neustadt, P.C.

[57] ABSTRACT

A trigger adaptor allowing a conventional pistol-grip type hand held power tool to be used when suspended pointing vertically downwards, so that the operator may grip the tool and position it where desired and still be able to actuate the tool trigger. The adaptor includes a tubular grip surrounding the tool barrel and freely rotatable around it. The grip extends between upper and lower annular securing parts each of which is secured to the tool barrel. A longitudinal groove in the grip carries an auxiliary trigger bar pivoted at a lower end thereof on a pin. When the trigger bar is squeezed inwardly, its upper end bears on the underside of a flange at the top of a tube. When the flange rises it drives up a pushrod, which contacts the tool trigger and moves it to actuate the tool.

24 Claims, 2 Drawing Sheets

Fig.1.
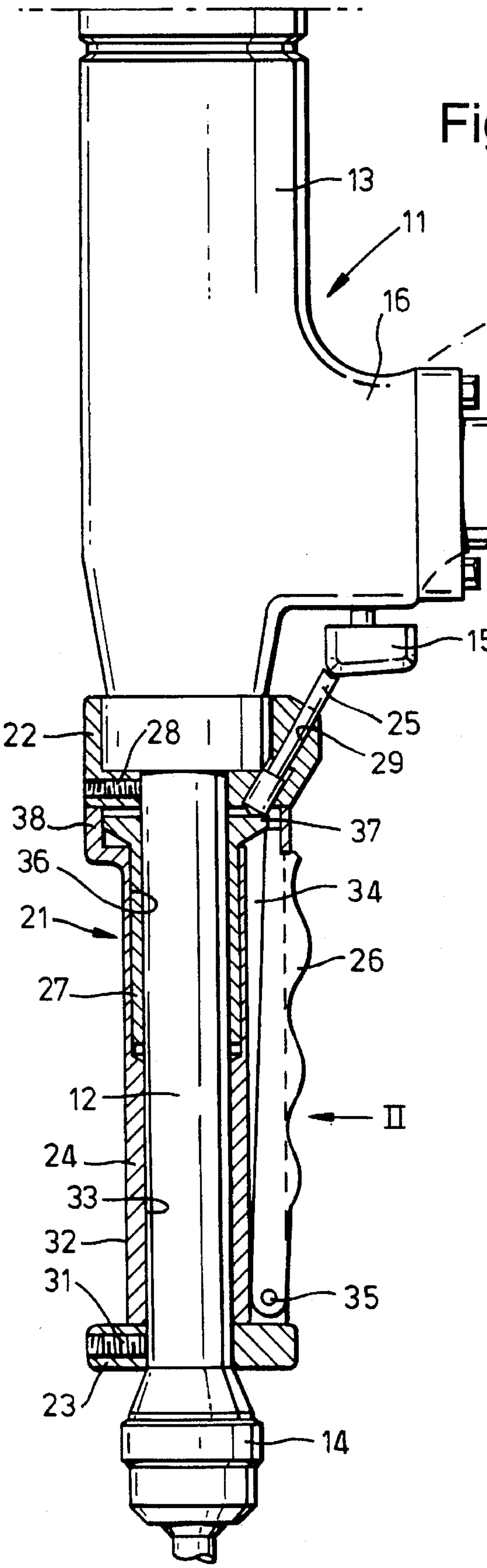
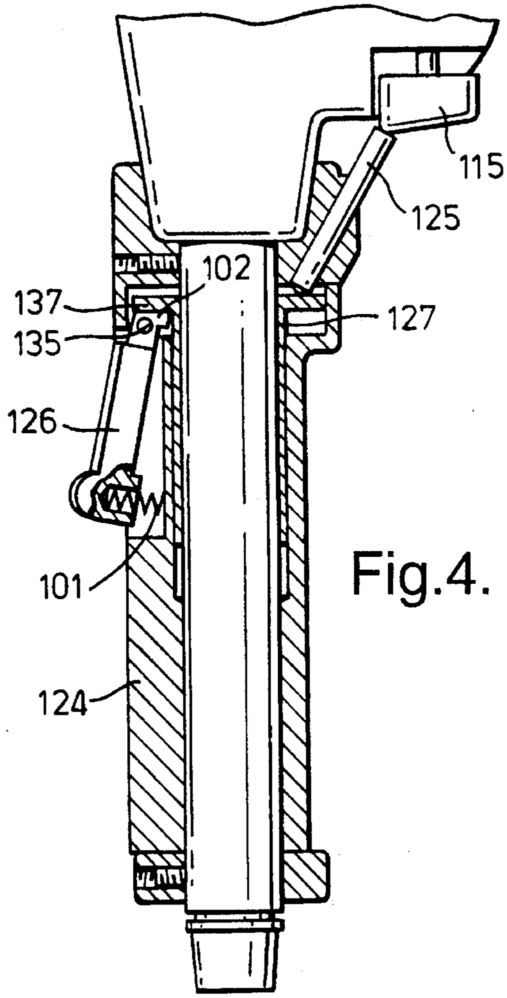
Fig.4.

ADAPTOR FOR HAND-HELD POWER TOOL

BACKGROUND OF THE INVENTION

1. Field of the Invention

Hand-held power tools are in common use for many purposes in industry. Typical examples are the electrically operated hand-held drill, and the pneumatically operated hand-held fastener placing tool. The latter may be arranged to place fasteners of various types, e.g. self-tapping screws, threaded inserts, or blind rivets. Since the tool, in use, will have to be positioned accurately, it must be possible for the operator to hold it securely in his or her hand (or maybe in both hands), in order to support the tool, to position the tool accurately, and maybe to support the mechanical reaction to the action of the tool in use. Accordingly the tool is provided with a suitably shaped and surfaced grip, often in the form of a pistol grip projecting transversely from the tool body. The tool is also provided with a trigger, in the appropriate position in relation to the grip, for operating by a finger of the operator's hand. This grip, and the location of the trigger, are fixed in relation to the body of the tool (although, of course, the trigger is able to move through a relatively small distance when operated).

2. Discussion of the Background

There has recently arisen a requirement for power operated tools to be mounted pointing downwards vertically above a workpiece or worktable, in such a way that the tool can be moved across the work to act on different locations thereon while gripped, guided and activated by the operator's hand. One common arrangement is for the tool to be mounted on a radial arm of adjustable length, e.g. a pantograph arm. The inboard end of the arm, about which the arm rotates, is mounted at the back of the worktable, while the operator stands or sits in front of the worktable. As the tool is moved around over the work, the angular relationship of the tool body, and therefore of the trigger, to the operator's hand, changes. Consequently the operator cannot maintain his grip on the tool body and cannot readily operate the tool trigger. It may be more economical to utilize an existing standard or slightly modified hand-held tool for such a purpose, instead of designing and constructing a special version of the tool. However, such use introduces some practical problems, such as the changing angular relationship just mentioned. The present invention is intended to overcome such a problem.

SUMMARY OF THE INVENTION

Accordingly, the invention provides an adaptor for a hand-held power tool which comprises a tool body and a tool trigger located at a position fixed in relation to the body, which adaptor comprises:

securing means releasably securable to the tool body in fixed relationship thereto;

grip means, adapted to be gripped by an operator and to be rotatable with respect to the securing means and the tool body when the securing means is secured to the tool body;

auxiliary trigger means mounted on the rotatable grip means;

and intermediate means, operatively connecting the auxiliary trigger means on the rotatable grip means to the tool trigger on the tool body;

whereby when the adaptor is mounted on the tool body by the securing means being secured to the tool body as aforesaid so that the intermediate means is connected to the tool trigger, actuation of the auxiliary trigger means acts on the intermediate means to cause the intermediate means to actuate the tool trigger, over a range of relative rotational positions of the grip means and the tool body.

In one embodiment of the invention, the intermediate means comprises trigger-contacting means mounted on the securing means so as to contact the tool trigger, and connecting means, operatively connecting the auxiliary trigger means on the rotatable grip means to the trigger-contacting means on the securing means.

The invention also provides an adaptor for a hand-held power tool which comprises a tool body and a tool trigger located at a position fixed in relation to the body, which adaptor comprises:

securing means releasably securably to the tool body in fixed relationship thereto;

grip means, adapted to be gripped by an operator and to be rotatable with respect to the securing means and the tool body when the securing means is secured to the tool body;

trigger-contacting means mounted on the securing means so as to contact the tool trigger;

auxiliary trigger means mounted on the rotatable grip means;

and connecting means, operatively connecting the auxiliary trigger means on the rotatable grip means to the trigger-contacting means on the securing means;

whereby, when the adaptor is mounted on the tool body by the securing means being secured to the tool body as aforesaid so that the trigger contacting means contacts the tool trigger, actuation of the auxiliary trigger means acts on the connecting means to cause the trigger-contacting means to actuate the tool trigger, over a range of relative rotational positions of the grip means and the tool body.

Preferably the connecting means is at least partly circular, thereby connecting the auxiliary trigger means to the trigger contacting means over a range of relative rotational positions. Preferably the connecting means is provided on a tubular member which is at least partially accommodated within the grip means. Preferably actuation of the auxiliary trigger causes axial movement of the connecting means.

Preferably the auxiliary trigger abuts one side of the connecting means and the trigger contacting means abuts the other side of the connecting means. Also preferably the trigger-contacting means comprises a pushrod.

In a preferred arrangement, the trigger-contacting means is carried within an aperture in the securing means.

Preferably the securing means comprises two parts spaced apart from each other with the grip means extending substantially between them.

The invention includes an adapator as aforesaid in combination with a hand-held power tool comprising a tool body and a tool trigger located at a position fixed to the body.

BRIEF DESCRIPTION OF THE DRAWINGS

A specific embodiment of the invention, in the form of a riveting tool fitted with an adaptor, will now be described by way of example and with reference to the accompanying drawings, in which:

FIG. 1 is a side elevational view of a tool fitted with an adaptor, the adaptor being shown in section;

FIG. 4 is similar to FIG. 1 but shows a modified form of auxiliary trigger.

DESCRIPTION OF THE PREFERRED EMBODIMENTS

Figure 2:
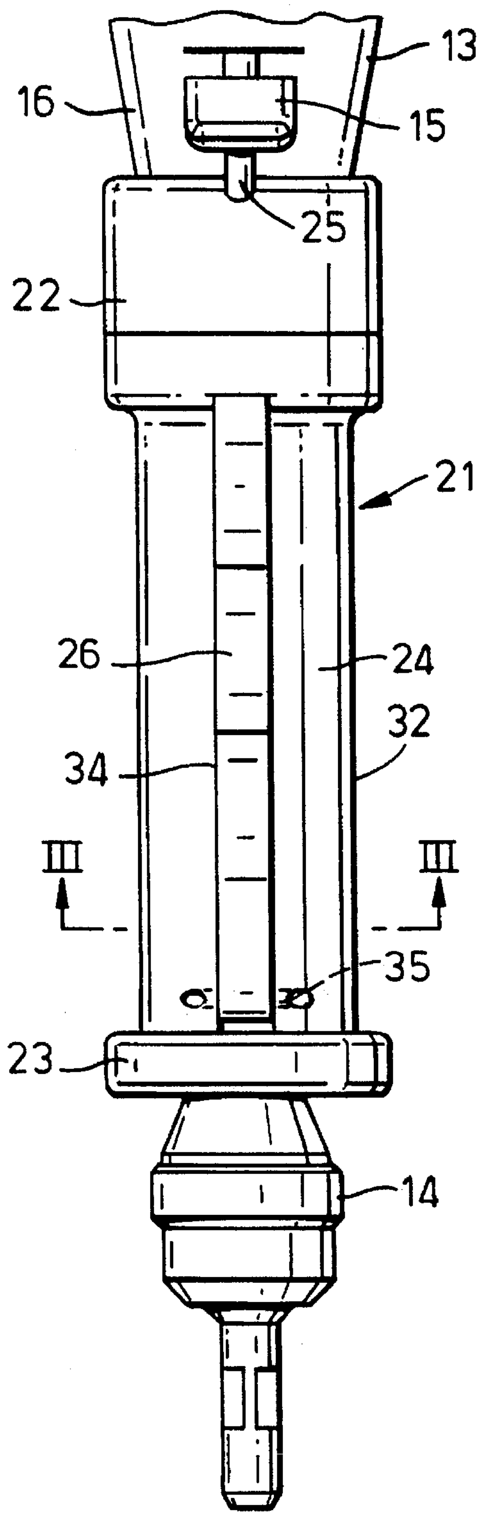
FIG. 2 is a side elevational view of the adaptor and part of the tool, taken in the direction of the arrow II in FIG. 1.
Figure 3:
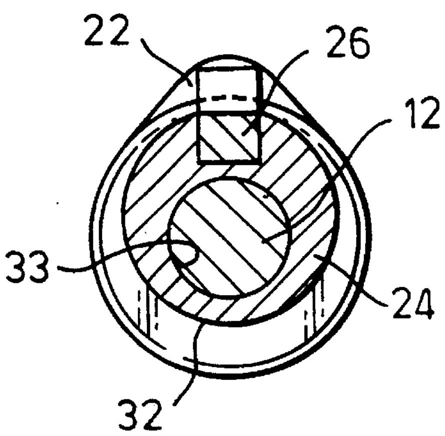
FIG. 3 is a cross-sectional view through the tool and adaptor taken along the line III—III in FIG. 2.

In this example, the hand-held tool 11 is a pneumatically powered tool for placing blind tubular rivets of the type commercially available under the registered trademarks CHOBERT, BRIV and RIVSCREW. The body of the tool essentially comprises an elongated cylindrical barrel 12, at one end of which is a pneumatic piston-and-cylinder device 13 and at the other end of which is a nosetip 14 to which rivets stored within the barrel 12 are fed for installation by the tool. The tool is fitted with a tool trigger 15, pressure on which operates the tool to instal each rivet. The trigger 15 is located at a fixed position on the tool body, on an extension 16 of the housing of the pneumatic device. The tool trigger is in a position convenient for operation by the forefinger of an operator holding the tool by means of a pistol grip 17 which is normally secured to the extension 16. In FIG. 1 the pistol grip 17 is shown in broken lines, since in this example it has been removed from the tool body and in its place is secured the end of a tool-support arm 18 (indicated schematically) of the type mentioned above. The tool is aligned vertically with the nosetip 14 pointing downwards. The tool support arm 18 carries a pneumatic supply line 19 which is connected to the inlet side of the valve actuated by the tool trigger 15. The construction and operation of such a tool (when fitted with the pistol grip 17 for hand-held use) is well understood and well known.

The adaptor 21 comprises securing means having two separated parts 22 and 23; grip means 24 of substantially tubular form; trigger-contacting means in the form of a pushrod 25 for contacting the tool trigger 15; auxiliary trigger means in the form of a bar 26; and connecting means in the form of an annular flange 37 connecting the trigger bar 26 to the pushrod 25. The flange 37 is formed at one end of the tube 27 for limited axial movement.

The securing means parts 22 and 23 are essentially annular. The upper part 22 is located at the upper end of the tool barrel 12 to which it is secured by a locking screw 28. It partly shrouds the adjacent lower end of the housing of the pneumatic device 13. The part nearest the trigger 15 is enlarged and carries an inclined bore 29 in which slides the pushrod 25. The lower securing means part 23 is adjacent the nosetip 14 at the bottom end of the tool barrel to which it is secured by a locking screw 31.

Between the upper and lower securing parts 22 and 23 extends the tubular grip 24. This is a tube having an essentially cylindrical outer surface 32, and a cylindrical bore 33 which is, however, eccentric with respect to the outer surface 32. The bore 33 is a rotating fit on the tool barrel 12. The thickest part of the wall of the tubular grip 24 is formed with an external groove 34 extending longitudinally. Within this groove is accomodated the auxiliary trigger bar 26. At its lower end it is pivoted on a pin 35 for limited in-and-out movement under the squeezing of the hand of an operator holding the exterior surface 32 of the grip tube 24. The outer face of the trigger bar 26 may be formed as shown in FIG. 1 to facilitate engagement by the operator's fingers.

The upper half of the grip tube bore 33 is formed with a counterbore 36 within which is accomodated the connecting tube 27. At its upper end the connecting tube is formed with the radially enlarged annular flange 37 which is accomodated within an enlargement 38 at the top of the grip tube. The underside of the flange 37 is bevelled and contacts the upper end of the trigger bar 26. The upper face of the flange 37 is flat and contacts the lower and inner end of the pushrod 25, the lower end face of the pushrod being bevelled to contact it. The upper and outer end of the pushrod 25 contacts the tool trigger 15. The tool trigger 15 is internally sprung towards the "off" position i.e. with the trigger 15 in the outwards, or in FIG. 1 the downwards, position.

FIG. 1 shows the configuration of the adaptor and tool in the "off" position. The sprung tool trigger 15 urges the pushrod 25 downwards, the pushrod 25 urges the connecting tube 27 downwards, the connecting tube flange 37 urges the adaptor trigger bar 26 outwards against the stop provided by contact of its upper end with the part of the enlargement 38 at the top of the groove 34. The operator grips the adapator by wrapping his fingers and palm around the outer surface 32 of the grip 24, with the fingers contacting the trigger bar 26. Since the grip 24 rotates freely about the longitudinal axis thereof around the tool barrel 12, the operator can maintain a secure and convenient grip on the tool as he moves it about over the worktable. The connector tube 27 and its flange 37 can rotate with respect to both the trigger grip 26 and the pushrod 25, thus operatively connecting them over a range of relative rotational positions in this example over the complete 360 degrees of relative rotational positions. When the operator squeezes the trigger bar 26, its upper end moving inwards across the bevelled underface of the flange 37 pushes the flange upwards, which pushes the pushrod 25 upwards, which pushes the tool trigger 15 against its spring and thus actuates the tool.

FIG. 4 illustrates an adaptor with a modified form of auxiliary trigger.

In this modification, the auxiliary trigger bar 126 is much shorter, extending for less than half of the length of the tubular grip 124. The trigger bar 126 is pivoted on a pin 135 at its upper end. The lower end of the trigger bar 126 is urged outwards by a spring 101. The upper end of the trigger bar has an inwardly projecting lug 102 which contacts the underside of the flange 137 of the connecting tube 127. When the trigger bar 126 is squeezed inwardly against the spring 101, the lug 102 rises and pushes the flange 137 upwards, thus forcing the pushrod 125 upwards to actuate the tool trigger 115.

The invention is not restricted to the details of the foregoing example. For example a compression spring may be provided under the trigger bar 26 in order to assist in returning it to its outermost position. The operative connection between the auxiliary trigger and the tool trigger could be provided over less than 360 degrees relative rotational position. This would enable the flange 37 to be only part circular.

With some configurations of tool, it would be possible for the intermediate means to comprise only one element, instead of both of the separate tube 36 and pushrod 25. An adaptor according to the invention can be used with other forms of tool e.g. a tool for placing other types of fastener, or for performing other functions such as drilling.

Obviously, numerous modifications and variations of the present invention are possible in light of the above teachings. It is therefore to be understood that, within the scope of the appended claims, the invention may be practiced otherwise than as specifically described herein.

We claim:

1. An adaptor for a hand-held power tool which comprises a tool body and a tool trigger located at a position fixed in relation to the body, which adaptor comprises:

securing means for being releasably secured to the tool body in fixed relationship thereto;

a grip for being gripped by an operator, said grip having a longitudinal axis and being rotatable about the longitudinal axis of the grip when the securing means is secured to the tool body;

an auxiliary trigger mounted on the grip; and intermediate means for operatively connecting the auxiliary trigger on the rotatable grip to the tool trigger on the tool body;

actuation of the auxiliary trigger causes the intermediate means to actuate the tool trigger over a range of relative rotational positions of the grip means and the tool body.

2. An adaptor as claimed in claim 1, wherein the intermediate means comprises a trigger-contacting member mounted on the securing means for contacting the tool trigger, and connecting means for operatively connecting the auxiliary trigger on the rotatable grip to the trigger-contacting member on the securing means.

3. An adaptor for a hand-held power tool which comprises a tool body and a tool trigger located at a position fixed in relation to the body, which adaptor comprises:

securing means for releasably securing the adaptor to the tool body in fixed relationship thereto;

a grip for being gripped by an operator, said grip having a longitudinal axis and being rotatable about the longitudinal axis of the grip when the securing means is secured to the tool body;

a trigger-contacting member mounted on the securing means so as to contact the tool trigger;

an auxiliary trigger mounted on the rotatable grip; and connecting means for operatively connecting the auxiliary trigger on the rotatable grip to the trigger-contacting member on the securing means;

wherein, when the adaptor is mounted on the tool body by the securing means being secured to the tool body so that the trigger contacting member contacts the tool trigger, actuation of the auxiliary trigger acts on the connecting means to cause the trigger-contacting member to actuate the tool trigger over a range of relative rotational positions of the grip and the tool body.

4. An adaptor as claimed in claim 2 or claim 3, wherein the connecting means is at least partly circular for connecting the auxiliary trigger to the trigger contacting member over a range of relative rotational positions.

5. An adaptor as claimed in claim 2 or claim 3 wherein the connecting means is provided on a tubular member which is at least partially accommodated within the grip.

6. An adaptor as claimed in claim 2 or claim 3, wherein the connecting means is axially movable in response to actuation of the auxiliary trigger.

7. An adaptor as claimed in claim 2 or claim 3, wherein the connecting means has a first side which is abutted by the auxiliary trigger and has a second side which is abutted by the trigger contacting member.

8. An adaptor as claimed in claim 3, wherein the trigger-contacting member comprises a pushrod.

9. An adaptor as claimed in claim 2, wherein the trigger-contacting member is carried within an aperture formed in the securing means.

10. An adaptor as claimed in claim 2 or claim 3, wherein the securing means comprises two parts spaced apart from each other with the grip extending substantially between said two parts.

11. A hand-held power tool, comprising:

a tool body and a tool trigger located at a position fixed in relation to the body, said power tool including an adaptor which comprises:

securing means for releasably securing the adaptor to the tool body in fixed relationship thereto;

a grip for being gripped by an operator, said grip having a longitudinal axis and being rotatable about the longitudinal axis of the grip when the securing means is secured to the tool body;

an auxiliary trigger mounted on the grip; and intermediate means for operatively connecting the auxiliary trigger on the grip to the tool trigger on the tool body;

wherein, when the adaptor is mounted on the tool body by the securing means being secured to the tool body so that the intermediate means is connected to the tool trigger, actuation of the auxiliary trigger causes the intermediate means to actuate the tool trigger over a range of relative rotational positions of the grip and the tool body.

12. A hand-held power tool, comprising:

a tool body and a tool trigger located at a position fixed in relation to the body, said power tool including an adaptor which comprises:

securing means for being releasably secured to the tool body in fixed relationship thereto;

a grip for being gripped by an operator, said grip having a longitudinal axis and being rotatable about the longitudinal axis of the grip when the securing means is secured to the tool body;

a trigger-contacting member mounted on the securing means so as to contact the tool trigger;

an auxiliary trigger mounted on the rotatable grip; and connecting means for operatively connecting the auxiliary trigger on the rotatable grip to the trigger-contacting member on the securing means;

wherein, when the adaptor is mounted on the tool body by the securing means being secured to the tool body so that the trigger contacting member contacts the tool trigger, actuation of the auxiliary trigger acts on the connecting means to cause the trigger-contacting member to actuate the tool trigger over a range of relative rotational positions of the grip and the tool body.

13. An adapter for a hand-held power tool which comprises a tool body and a tool trigger located at a position fixed in relation to the body, which adaptor comprises:

a securing mechanism releasably secured to the tool body in fixed relationship thereto;

a grip mechanism, said grip mechanism having a longitudinal axis and being rotatable about the longitudinal axis of the grip mechanism when the securing mechanism is secured to the tool body;

an auxiliary trigger mounted on the rotatable grip mechanism; and an intermediate connector operatively connecting the auxiliary trigger on the grip mechanism to the tool trigger on the tool body;

wherein actuation of the auxiliary trigger causes the intermediate connector to actuate the tool trigger over a range of relative rotational positions of the grip mechanism and the tool body.

14. An adaptor as claimed in claim 13, wherein the intermediate connector comprises a trigger-contacting mechanism mounted on the securing mechanism so as to contact the tool trigger, and a connecting mechanism operatively connecting the auxiliary trigger on the rotatable grip mechanism to the trigger-contacting mechanism on the securing mechanism.

15. An adaptor for a hand-held power tool which comprises a tool body and a tool trigger located at a position fixed in relation to the body, which adaptor comprises:

a securing mechanism releasably secured to the tool body in fixed relationship thereto;

a grip mechanism, said grip mechanism having a longitudinal axis and being rotatable about the longitudinal axis of the grip mechanism when the securing mechanism is secured to the tool body;

a trigger-contacting mechanism mounted on the securing mechanism so as to contact the tool trigger;

an auxiliary trigger mounted on the rotatable grip mechanism; and a connecting mechanism operatively connecting the auxiliary trigger on the rotatable grip mechanism to the trigger-contacting mechanism on the securing mechanism;

wherein actuation of the auxiliary trigger acts on the connecting mechanism to cause the trigger-contacting mechanism to actuate the tool trigger, over a range of relative rotational positions of the grip mechanism and the tool body.

16. An adaptor as claimed in claim 14 or claim 15, wherein the connecting mechanism is at least partly circular to connect the auxiliary trigger to the trigger contacting mechanism over a range of relative rotational positions.

17. An adaptor as claimed in claim 14 or claim 15 wherein the connecting mechanism is provided on a tubular member which is at least partially accommodated within the grip mechanism.

18. An adaptor as claimed in claim 14 or claim 15, wherein the connecting mechanism is axially movable in response to actuation of the auxiliary trigger.

19. An adaptor as claimed in claim 14 or claim 15, wherein the connecting mechanism has a first side which is abutted by the auxiliary trigger and has a second side which is abutted by the trigger contacting mechanism.

20. An adaptor as claimed in claim 14 or claim 15, wherein the trigger-contacting mechanism comprises a pushrod.

21. An adaptor as claimed in claim 14 or claim 15, wherein the trigger-contacting mechanism is carried within an aperture formed in the securing mechanism.

22. An adaptor as claimed in claim 14 or claim 15, wherein the securing mechanism comprises two parts spaced apart from each other with the grip mechanism extending substantially between said two parts.

23. A hand-held power tool, comprising:

a tool body and a tool trigger located at a position fixed in relation to the tool body, the power tool including an adaptor which comprises:

a securing mechanism releasably secured to the tool body in fixed relationship thereto;

a grip mechanism, said grip mechanism having a longitudinal axis and being rotatable about the longitudinal axis of the grip mechanism when the securing mechanism is secured to the tool body;

an auxiliary trigger mounted on the rotatable grip mechanism; and an intermediate connector operatively connecting the auxiliary trigger on the grip mechanism to the tool trigger on the tool body;

wherein, when the adaptor is mounted on the tool body by the securing mechanism being secured to the tool body so that the intermediate connector is connected to the tool trigger, actuation of the auxiliary trigger causes the intermediate connector to actuate the tool trigger, over a range of relative rotational positions of the grip mechanism and the tool body.

24. A hand-held power tool, comprising:

a tool body and a tool trigger located at a position fixed in relation to the body, said power tool including an adaptor which comprises:

a securing mechanism releasably secured to the tool body in fixed relationship thereto;

a grip mechanism, said grip mechanism having a longitudinal axis and being rotatable about the longitudinal axis of the grip mechanism when the securing mechanism is secured to the tool body;

a trigger-contacting mechanism mounted on the securing mechanism so as to contact the tool trigger;

an auxiliary trigger mounted on the rotatable grip mechanism; and a connecting mechanism operatively connecting the auxiliary trigger on the rotatable grip mechanism to the trigger-contacting mechanism on the securing mechanism;

wherein actuation of the auxiliary trigger acts on the connecting mechanism to cause the trigger-contacting mechanism to actuate the tool trigger over a range of relative rotational positions of the grip mechanism and the tool body.

* * * * *

UNITED STATES PATENT AND TRADEMARK OFFICE

CERTIFICATE OF CORRECTION

PATENT NO. : 5,588,495

DATED : December 31, 1996

INVENTOR(S) : Aiden R. DEAR, ET AL.

It is certified that error appears in the above-indentified patent and that said Letters Patent is hereby corrected as shown below:

Column 5, line 18, before "actuation" insert --wherein--.

Signed and Sealed this

Twenty-fourth Day of June, 1997

Attest:

BRUCE LEHMAN

*Attesting Officer*

*Commissioner of Patents and Trademarks*